United States Patent
Bopardikar et al.

(10) Patent No.: US 6,640,285 B1
(45) Date of Patent: Oct. 28, 2003

(54) METHOD AND APPARATUS FOR IMPROVING THE EFFICIENCY OF CACHE MEMORIES USING STORED ACTIVITY MEASURES

(75) Inventors: Raju C. Bopardikar, Calisle, MA (US); Jack J. Stiffler, Marion, MA (US)

(73) Assignee: EMC Corporation, Hopkinton, MA (US)

(*) Notice: Subject to any disclaimer, the term of this patent is extended or adjusted under 35 U.S.C. 154(b) by 378 days.

(21) Appl. No.: 09/697,765

(22) Filed: Oct. 26, 2000

(51) Int. Cl.⁷ .............................................. G06F 12/00
(52) U.S. Cl. ..................... 711/133; 711/141; 711/154; 711/159
(58) Field of Search ................................ 711/133, 136, 711/134, 141, 144, 145, 154, 159, 160, 167, 112, 113

(56) References Cited

U.S. PATENT DOCUMENTS

| 4,967,353 | A |   | 10/1990 | Brenner et al. ............. 711/160 |
| 5,043,885 | A | * | 8/1991 | Robinson ..................... 711/133 |
| 5,392,415 | A |   | 2/1995 | Badovinatz et al. ........ 709/100 |
| 5,983,318 | A | * | 11/1999 | Willson et al. ............. 711/113 |
| 6,128,713 | A | * | 10/2000 | Eisler et al. ................. 711/159 |
| 6,209,062 | B1 | * | 3/2001 | Boland et al. .............. 711/134 |
| 6,272,598 | B1 | * | 8/2001 | Arlitt et al. .................. 711/133 |
| 6,282,613 | B1 | * | 8/2001 | Hsu et al. ..................... 711/118 |
| 6,298,419 | B1 | * | 10/2001 | Kontothanassis et al. ... 711/147 |
| 6,425,057 | B1 | * | 7/2002 | Cherkasova et al. ........ 711/134 |

FOREIGN PATENT DOCUMENTS

WO  WO 01/46809 A1  6/2001

OTHER PUBLICATIONS

Tanenbaum, "Structured Computer Organization", ©1984, Prentice–Hall, Inc., p. 10–12.*
Handy, "The Cache Memory Book", ©1998, , Academic Press, Inc., p. 19–21.*

* cited by examiner

Primary Examiner—Donald Sparks
Assistant Examiner—Brian R. Peugh
(74) Attorney, Agent, or Firm—Kudirka & Jobse, LLP

(57) ABSTRACT

Cache memory lines are dynamically paged out to underlying storage in accordance with their current levels of activity and are clustered for paging purposes on the same basis. Activity measures are assigned to each line when it is paged into cache; these measures are updated whenever a cached line is re-accessed. When space is needed in the cache for new lines, the activity measures are sorted based on their relative activity levels and those lines that are least active are grouped onto pages and paged out together. In this manner, the currently most active lines are retained in the cache; and lines having the same temporal characteristics and access frequencies are grouped together on the same page, thereby increasing the likelihood that when a new line is brought into the cache, the other lines that are on the same page, and hence that are brought into cache along with requested line, will themselves soon again become active.

31 Claims, 7 Drawing Sheets

METHOD AND APPARATUS FOR IMPROVING THE EFFICIENCY OF CACHE MEMORIES USING STORED ACTIVITY MEASURES

FIELD OF THE INVENTION

This invention relates to data processing and storage systems and more particularly to cache memory storage used in such systems.

BACKGROUND OF THE INVENTION

In virtually every system involving the processing or communication of information, blocks of data must be stored in, retrieved from, or transferred between, storage systems. During the movement of such data, it is common practice to temporarily store at least some of the data blocks in small memories called cache memories. Cache memories are generally used to reduce the time required to access the data.

For example, the speed of information retrieval from a storage system differs radically between systems depending on the type and construction of the storage system. There is often a tradeoff between retrieval speed and storage system cost. For example, rotating disk storage systems are very cost effective, but suffer from long retrieval times or latency because gross physical motion of the rotating disk or read head is often required to retrieve a particular block of data. On the other hand, semiconductor storage. systems, such as random access memories, do not require physical motion to retrieve data and thus often have very fast retrieval times. However, these memories are generally much more expensive than disk-based systems. Therefore, in order to reduce data access time and still decrease the storage costs, a small semiconductor memory is often used to cache data retrieved from a disk storage system.

The cache memory conventionally has a much smaller capacity than the disk storage system and stores the most frequently requested data. If a data block that is present in the cache memory is requested, then a cache "hit" results and the data can be retrieved directly from the cache memory with much lower retrieval time. If a data block that is not in the cache memory is requested, then a cache "miss" results and the data must be retrieved from the underlying storage system with a higher retrieval time. In case of a cache miss, the requested data may be stored in the cache memory so that a subsequent request for the same data will result in a cache "hit." Special algorithms are used to decide which data blocks to keep in the cache memory, which blocks to discard and which blocks to store in the associated storage system (called paging the blocks out.) These same issues apply to a greater or lesser degree in any context in which blocks of data from one level in the storage media hierarchy are cached at another level. In this more general context, the data blocks that are moved into, or out of, the cache memory are often referred to as cache "lines."

The efficiency of such a cache memory is obviously highly dependent on the methods used to determine what cache lines to store in the cache memory, how long to retain the cache lines in the cache memory and when to release the cache lines from the cache memory (by either discarding them if they haven't been modified or paging them out if they have been modified). to make room for new lines that are presumably in higher demand. Thus, management of cache memory systems often revolves around the selection and implementation of these methods.

The management of cache memories is further compounded in storage systems in which data is efficiently stored and retrieved in data blocks called "pages." If the page size, or the amount of data that is moved back and forth between the cache and the next level of memory, consists of more than one cache line and the way in which cache lines are assembled into pages is largely unconstrained, then the cache memory efficiency will be highly dependent on how the cache lines are assembled into pages. For example, cache memory performance can be greatly enhanced by grouping cache lines that tend to be accessed in close time proximity into the same page so that these lines can be stored and retrieved at the same time.

An example of a caching environment demonstrating cache memory management problems is one involving typical file systems that use an underlying page-oriented storage system. Information that describes the attributes of the various files and directories (i.e., file system "objects") comprising the file system and that identifies where those objects can be found in the media used to store them is usually referred to as file system "metadata." This metadata itself must be assembled into pages and stored, generally on the same medium used to store the file system data. Typically, each object in a file system is assigned an identification number called a "handle" when it is created and that handle (or some portion of it) is used to locate the object whenever a subsequent reference is made to it. A metadata structure is then maintained that maps between object handles and physical disk locations where the corresponding object attributes are stored so that object attributes can be retrieved with an object handle.

An object's attributes generally comprise a small amount of data and, since it is inefficient to read amounts of data less than a page from the underlying storage system, the attributes of multiple objects—generally on the order of eight to sixteen objects—are combined to form a single page of the metadata structure. In a conventional file system, the attributes on a page typically correspond to attributes for objects with related object handles. Because an object handle is assigned at the time the object is created and the handle is based, for example, on the object's name or on the chronological order of its creation, the attributes on a page describe objects that tend to be uncorrelated. Therefore, when a page is retrieved using a handle to get access to an object's attributes, the other attributes on that page are not likely to be of current interest.

Nevertheless, since an object that has been accessed is likely to be accessed again within a relatively short period of time, most known file systems attempt to cache the page containing the desired object's attributes so that they do not have to be repeatedly retrieved from the underlying storage. The result is that most of the cached attributes are not of current interest and the effectiveness of the cache is much less than it would be if all cached attributes were associated with objects that were currently active.

As an alternative to caching the entire page of attributes, some file systems cache only the attributes of the object of interest. This strategy still suffers from two major disadvantages. First, an entire page still has to be fetched from the underlying storage in order to get access to the attributes associated with only one object, thereby eliminating the efficiencies obtained by reading entire pages from the underlying storage. Second, since the attributes associated with an object usually contain information that dynamically changes, such as the time the object was must recently accessed, those attributes must be paged back to the underlying storage when space in the cache is needed for more current information. Since the entire page is not cached, during the paging back process, the page must be re-read from the underlying storage so that the changed attribute can be modified and then the entire page must be rewritten to the underlying storage.

Therefore, there is need for a cache memory management system that can efficiently use cache memories with a page-oriented underlying storage system.

SUMMARY OF THE INVENTION

In accordance with the principles of the present invention, the efficiency of cache memories is improved by assigning to each cache line a measure of its relative activity and using that measure to determine which lines to retain in the cache memory and which lines to remove when room is needed for new lines.

In accordance with a preferred embodiment, if the page size exceeds the line size and the cache manager has the ability to determine how lines are assembled into pages, the cache memory efficiency is further improved by dynamically grouping lines into pages in accordance with the current levels of line activity as indicated by this same measure. Lines that are grouped in this manner are correlated in the sense that they tend to be accessed at roughly the same time and with roughly the same frequency with the result that, when one such line is accessed, the other lines on that same page are likely to be needed as well.

In accordance with yet another embodiment, the assignment of lines to pages is dynamic so that changes in the correlations among the lines due to changes in user request patterns will get reflected in the way the lines are grouped into pages. The result is that, at any instant, the cache contains primarily lines that are currently active thereby providing a significantly higher likelihood that next line to be accessed is already cached and can be directly retrieved from the cache memory.

BRIEF DESCRIPTION OF THE DRAWINGS

The above and further advantages of the invention may be better understood by referring to the following description in conjunction with the accompanying drawings in which.

DETAILED DESCRIPTION

Figure 1:
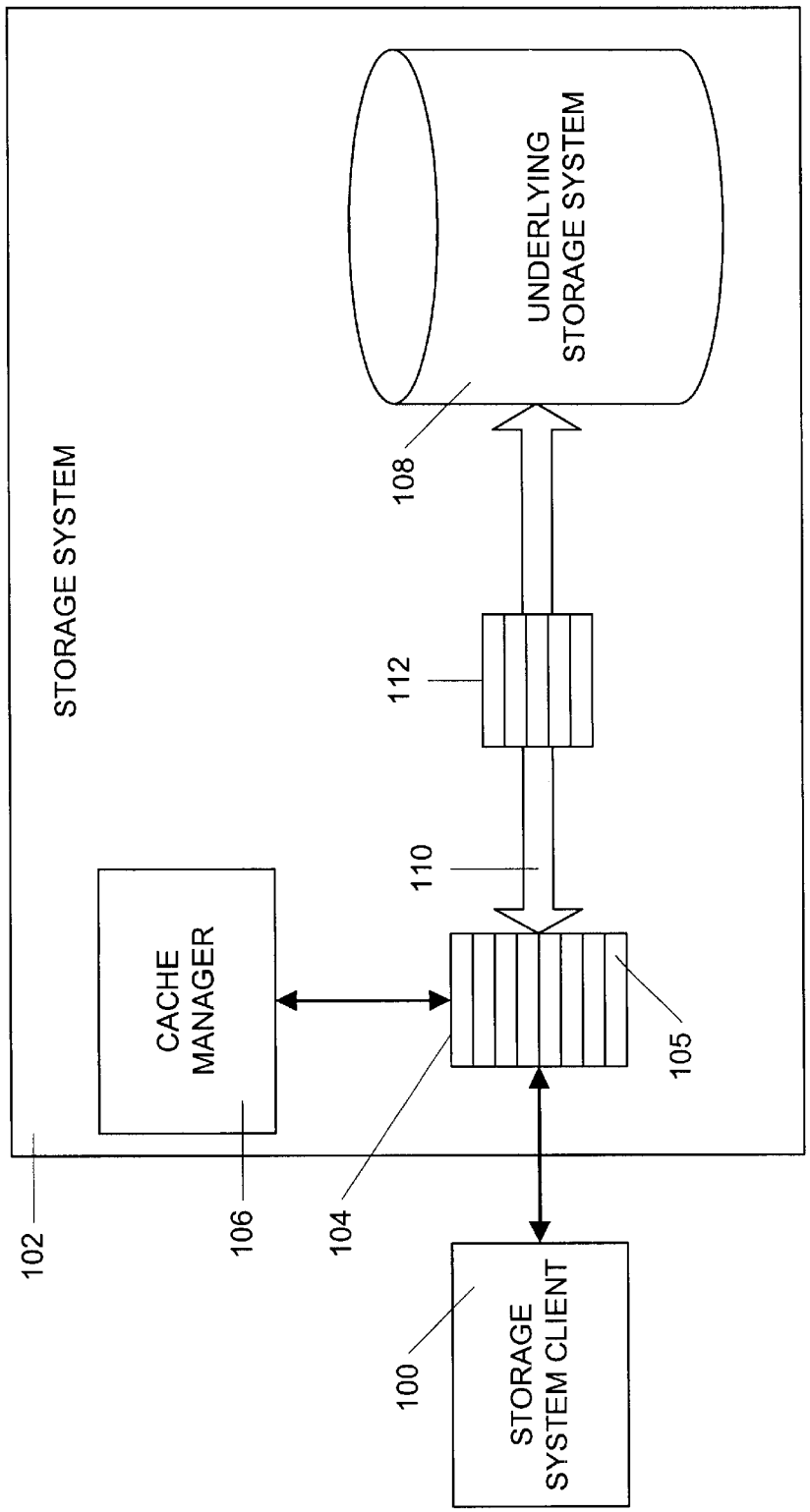
FIG. 1 is a block schematic diagram of a conventional cache memory system.

FIG. 1 is a block schematic diagram that indicates the operation of a conventional cache memory system. In this system, a storage system client 100 interacts with the storage system 102 to retrieve data from an underlying storage system 108. In order to reduce the access time of the storage 108 a cache memory 104 is used. Cache memory 104 stores data in cache lines of which cache line 105 is an example.

When client 100 requests data, the storage system 102 first examines cache memory 104 to determine whether the requested information resides in the memory 104. If the information is in the memory 104, a cache hit occurs, the cache line, or lines, containing the requested data are accessed and the information is returned directly to the client 100 from the cache memory 104.

Alternatively, if the requested information is not in the cache memory 104, then a cache miss occurs and the cache manager 106 retrieves the data from the underlying storage system 108 and returned to the client 100 and may also be stored in the cache memory 104. Information passes in pages between the cache memory 104 and the underlying storage system 108 as schematically illustrated by arrow 110. In the system illustrated, a page 112 consists of five cache lines although a page could consist of more or fewer cache lines. If the cache memory is already full of data, room must be made for the newly retrieved data. Typically, some data is removed. If that data has been modified since it was retrieved from the underlying storage system 108, then the information must be stored or paged back into the storage system 108. Generally, an entire page is stored back into storage system 108. Alternatively, if the data that is being removed has not been changed since it was retrieved, then it can be discarded.

Figure 2:
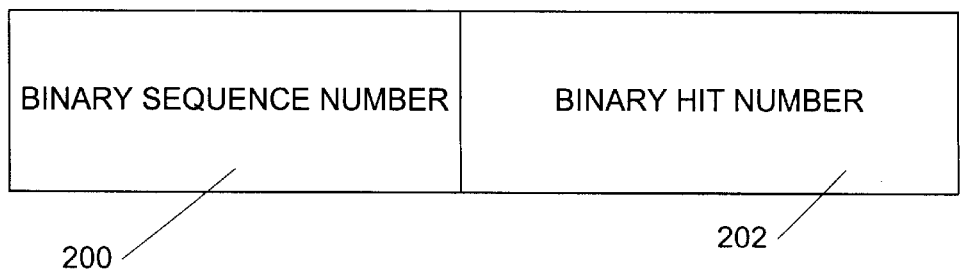
FIG. 2 is a block schematic diagram of the activity measure used to select cache lines for removal from the cache memory.

In accordance with the principles of the invention, the operation of the cache memory 104 is improved by associating an activity measure with each cache line 105. Although various activity measures could obviously be used, the preferred measure consists of two components and is illustrated in FIG. 2. The first component 200, designated as "x", is a binary sequence number related to the time at which the associated cache line was last accessed. The second component 202 designated as "y", is a binary hit number reflecting the number of times (with a maximum value $Y_{max}$) that the associated cache line has been accessed since it was last brought into cache.

When new cache lines are brought into the cache memory, a measure is assigned as follows. The current sequence number, x, is incremented, modulo-N, each time a new cache line is brought into the cache memory, where N is the capacity of the cache memory measured in the number of cache lines that it can store. The incremented sequence number is assigned to the measure for the new cache line. The hit number of the measure is set to "1" by clearing and then incrementing it so that the measure associated with a new line that was brought into the cache memory as the result of a cache miss is $x_0$, 1, where $x_0$ is the current (post-incremented) sequence number. Other cache lines that were loaded into the cache memory as a consequence of being on the same page as the line causing the cache miss are assigned the activity measure $x_0$, 0.

As a result, when a new page is brought into the cache memory, the measures associated with the cache lines on that page that were not the line causing the cache miss are still assigned a measure based on the current sequence number. This measure insures that those lines are not immediately paged back out before they have had a chance to be accessed. Since the inventive procedure groups lines in accordance with their activities, and since lines that are accessed in close time proximity and with similar repetitiveness are likely to be re-accessed in close time proximity, the remaining lines on the page thus fetched are highly likely soon to be accessed themselves.

When a line already in the cache memory is accessed as the result of a cache hit, the hit number of the associated measure is incremented up to its maximum so that associated measure is changed to $x_0$, y+1 for $y<y_{max}$ and to $x_0$, $y_{max}$ otherwise, with $x_0$ again equal to the current (non-incremented) sequence number and y equal to the hit number previously stored with the line. In this manner, time, as measured by the parameter x is divided into intervals corresponding to the time between successive cache misses. Two lines last accessed during the same time interval have different measures only if one has been accessed more often than the other.

When some cache lines need to be paged out to the underlying storage system to make room for new cache lines, a page is assembled from cache lines. In accordance with the principles of the invention, these cache lines may not be adjacent to one another. Instead, the following method is used to identify the lines to be removed. The measure associated with each valid cache line is added, without end-around carry, to the one's complement of the value $x_0$, $Y_{max}$ and the lines yielding the n smallest values are selected, with n equal to the number of lines to be paged out.

This operation yields a "metric" that sorts the lines according to the amount of time since the lines were last accessed, and, among those lines that were last accessed during the same time interval, according to the number of times they were accessed since being brought into the cache. In particular, adding a d-digit binary number a to its one's complement a* yields the d-digit all-ones binary number "111 . . . 1." Similarly, adding a* to a+1 yields the (d+1)-digit binary number "100 . . . 0", but the metric of interest is restricted to d digits and is formed without end-around carry, so the result is the all-zeros binary number "000 . . . 0." In a like manner, adding a* to a +2 yields "000 . . . 1", adding a* to a +3 yields "000 . . . 2", etc., and adding a* to a +($2^d$-1) yields "111 . . . 10." However, since a +($2^d$-1)= a-1, modulo $2^d$, the largest number that is smaller than a (in the ring of integers module $2^d$) yields the largest possible metric other than a itself. Consequently, the metric, as defined, orders the integers (a+1, a+2 , . . . ,a-2, a-1, a) in ascending numerical order, as desired.

The smaller the resulting metric, the greater the time since the corresponding line was last accessed and, among those lines last accessed during the same time interval, the smaller the metric, the fewer the number of times it was accessed. Thus, in situations in which all lines in the cache are actively being accessed, the least frequently accessed lines are selected to be paged out. In situations in which some lines have ceased to be of current interest, those lines are the first to be paged out. The correlation among the lines on a page, combined with the fact that lines are retained in the cache memory on the basis of their relative activity, results in significantly greater cache hit ratios than was possible with prior-art techniques.

It should be noted that, since x does not repeat any given value until it has been incremented N times, where N is equal to the total number of cache lines in the cache memory, it is not possible for any two cache lines to have associated measures with the same value of x unless they were last accessed during the same time interval. If there were no cache hits, every line in the cache would have a unique value of x. In most situations, the number of unique values of x will be considerably less than the maximum possible number of N. In any case, the procedure described above will always yield metrics that decrease in value in direct proportion to the number of time intervals separating the current time interval and the one during which the cache line in question was last accessed.

One advantage of this procedure is that when a cache line is accessed, only its associated activity measure is affected; all activity measures associated with other lines remain the same. If the activity measures are stored in a metric memory, then only one metric memory access will be required per cache line access rather than the N metric memory accesses that might be required with other activity measures.

Figure 3:
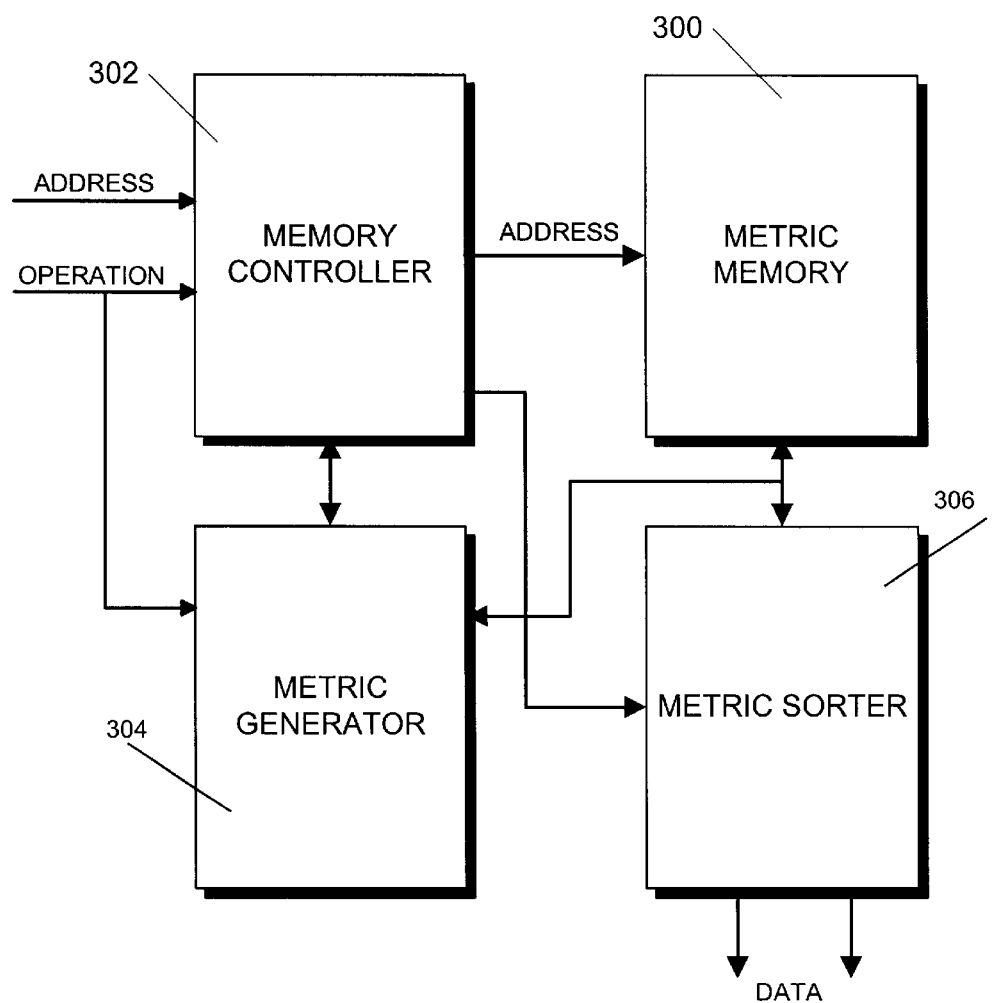
FIG. 3 is a block schematic diagram illustrating the interconnection of the memory controller with the metric memory, metric generator and metric sorter.

A metric handler capable of implementing the measures and method just described is schematically shown in FIG. 3. The handler consists of a metric memory 300, a memory controller 302, a metric generator 304 and a metric sorter 306. The N-word metric memory 300 has a word associated with each of the N cache lines in the cache memory. Each word stores one activity measure for an associated cache line, and a bit indicating whether the activity measure corresponds to a valid cache entry. Memory 300 is controlled by a memory controller 302. The memory controller 302 accepts an address for access to a specific metric memory location and a command that specifies an operation to be performed on the specified memory location. The possible operations to be performed include updating the addressed location as the result of a cache hit, inserting a new activity measure into the addressed location and invalidating the addressed location. In addition, two system-wide operations can be performed including initiating a metric sort and enabling the next sorted output. The metric generator 304 is controlled by the operation specification to generate or update the activity measures stored in the metric memory 300. The metric sorter 306 performs a sort of the metrics generated from the measures stored in the memory 300 in order to select the cache lines for removal.

Figure 4:
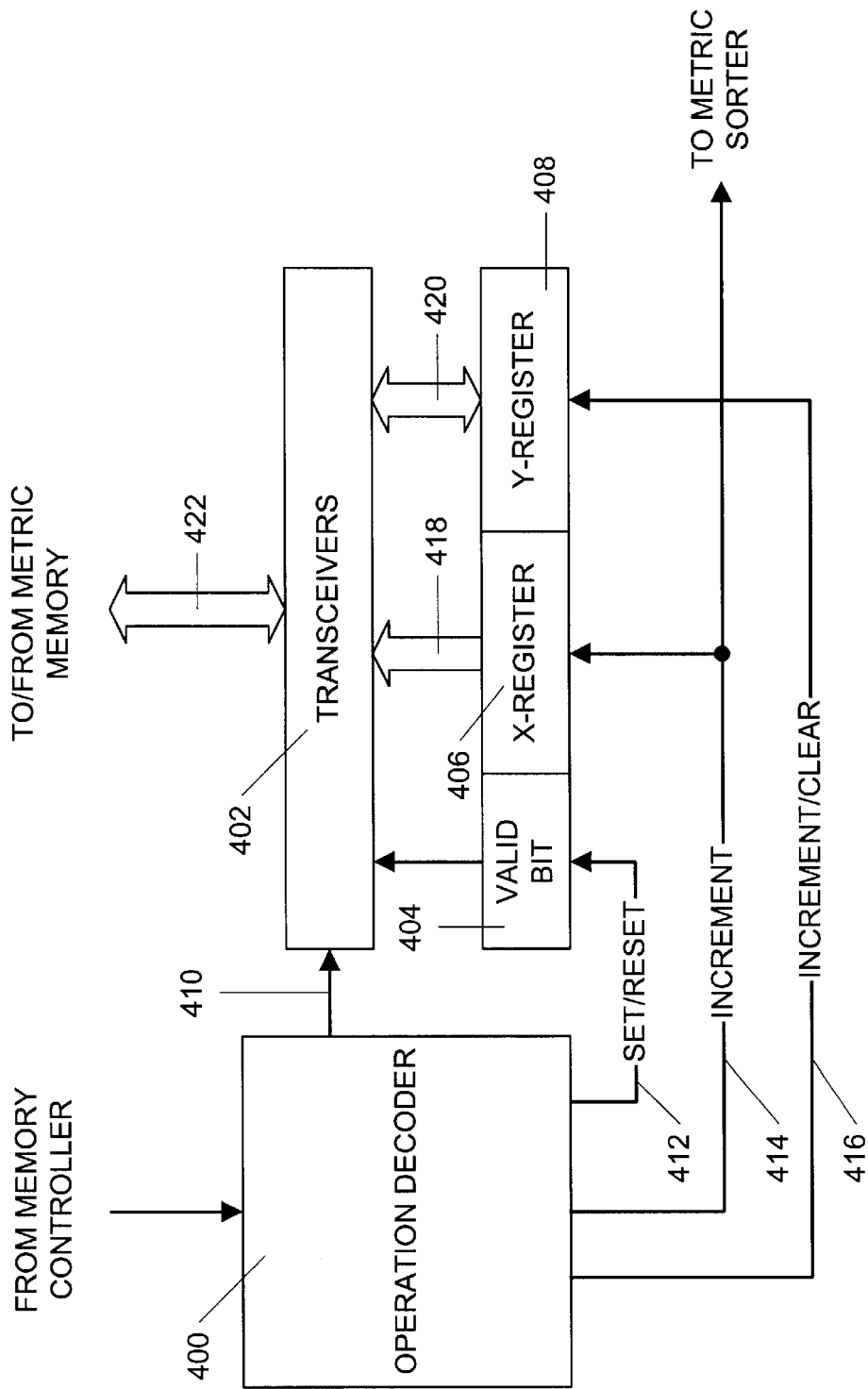
FIG. 4 is a detailed schematic block diagram of the metric generator.

The metric generator 304 is shown in greater detail in FIG. 4 and comprises an operation decoder 400, a set of registers 404–408 and transceivers 402 that connect the metric generator 304 to the metric memory 300. The operation decoder 400 translates the operation field of the received command into appropriate control operations on leads 410–416. Specifically, on update operations, operation decoder 400 sets the valid bit 406 via lead 412. It controls the transceivers 402, via lead 410, to read the y field (hit number) of the current activity measure at the addressed location in the metric memory 300 (illustrated by arrow 422) through the transceivers 402 into the y-register 408 as schematically indicated by arrow 420. Then, the operation decoder increments the y-register 408, and reverses the transceivers, via lead 410, to enable the new activity measure, consisting of the current contents of the x-register 406 and the contents of the incremented y-register 408 to be stored back to the same location in the metric memory 300 as indicated by arrow 420.

To insert the activity measure into the metric memory 300 for a line brought into the cache as a result of a cache miss, the operation decoder 400 increments the x-register 406, via lead 414, and clears and then increments the y-register 408, via lead 416, sets the valid bit 406 via lead 412. It then sets the transceivers 402, via lead 410, to enable the new activity measure to be stored to the addressed location. Activity measures for the other lines on the same page (that is, the lines brought into the cache memory along with the line causing the miss) are similarly generated and loaded into the metric memory 300, except for those lines the y-register 408 is cleared without being incremented.

Invalidation involves resetting the valid bit 406, via lead 412, and enabling the transceivers 402, via lead 410, in order to store the valid bit in the addressed memory location. The metric generator does not participate in the metric sort or metric output operations other than to send an increment signal to the metric sorter 306.

Figure 5:
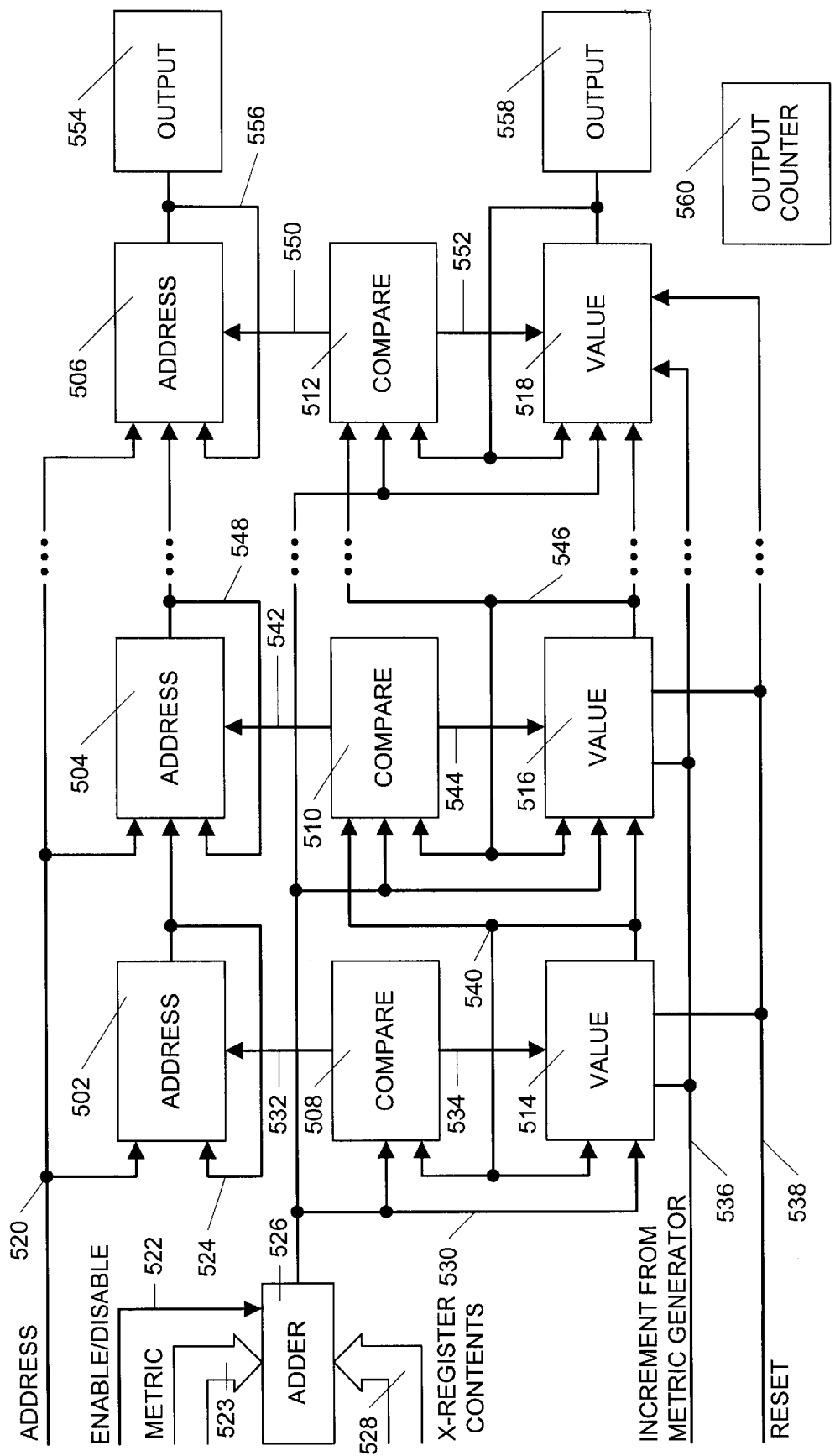
FIG. 5 is a detailed block diagram of the metric sorter.

FIG. 5 shows a more detailed block diagram of the metric sorter 306. It consists of many "stages" of which three are shown. Each stage comprises an address register, a comparator and a value register. For example, the first stage consists of address register 502, comparator 508 and value register 514. In one embodiment, the number of stages is selected to be equal to the number of cache lines on a page.

In response to a command to initiate a metric sort, the memory controller 302 sets an internal sort-address register (not shown) to the address of the first location in the metric memory 300. The memory controller 302 then sequences through all memory locations in the metric memory until it reaches the last location at which time it halts. At each location, the memory controller 302 queries the memory 300 and both the contents of the addressed location (the activity measure) and the address itself are presented to the metric sorter on busses 523 and 520, respectively and to the metric generator as previously described. If the valid bit of the retrieved activity measure is set, the activity measure is added, by means of adder 526, to the value $x_0$, $y_{max}$ with $x_0$ equal to the one's complement of the contents of the x-register (406, FIG. 4) in the metric generator and $y_{max}$ equal to the maximum value supported for the hit number y. If the valid bit is not set, the input to the sorter is ignored.

The results of these successive additions are presented to the comparators (508–512) where the results are compared with the contents of the corresponding value registers (514–518). For example, comparator 510 receives the adder results on bus 530, the output of value register 516 on bus 546 and the output of value register 514 on bus 540. Similarly, comparator 518 receives the adder results on bus 530, the output of value register 518 on bus 557 and the output of value register 516 on bus 546. Each comparator implements a decision based on $\alpha$, $\beta$ and $\gamma$, with $\alpha$, $\beta$ and $\gamma$ representing the inputs to the comparator generated from the adder 526, the value stored in its corresponding value register and the value stored in the value register of the preceding stage, respectively. Each comparator controls its corresponding address and value registers to make the selection. For example, comparator 508 controls address register via control bus 532 and value register 514 via control bus 534. Similarly, comparator 510 control address register 504 and value register 516 via controls busses 542 and 544, respectively. Comparator 512 control address register 506 and value register 518, via control busses 550 and 552, respectively. Under control of the comparators the following selections are made by the value and address registers:

If $\alpha \leq \gamma$ select value and address outputs from previous stage

If $\gamma < \alpha \leq \beta$ select value and address outputs from current stage If $\beta < \alpha$ select adder value and address from memory controller The selected values are then stored in the value registers and the corresponding address registers by means of a store control (not shown.) Since the metric sorter's first stage has no preceding stage, it simply selects $\alpha$ if it is less than or equal to $\beta$ and selects $\beta$ otherwise. Then the next activity measure and address are presented to the sorter, a selection made and stored. Operation continues in this manner until all N stored activity measures have been sorted.

Figure 6:
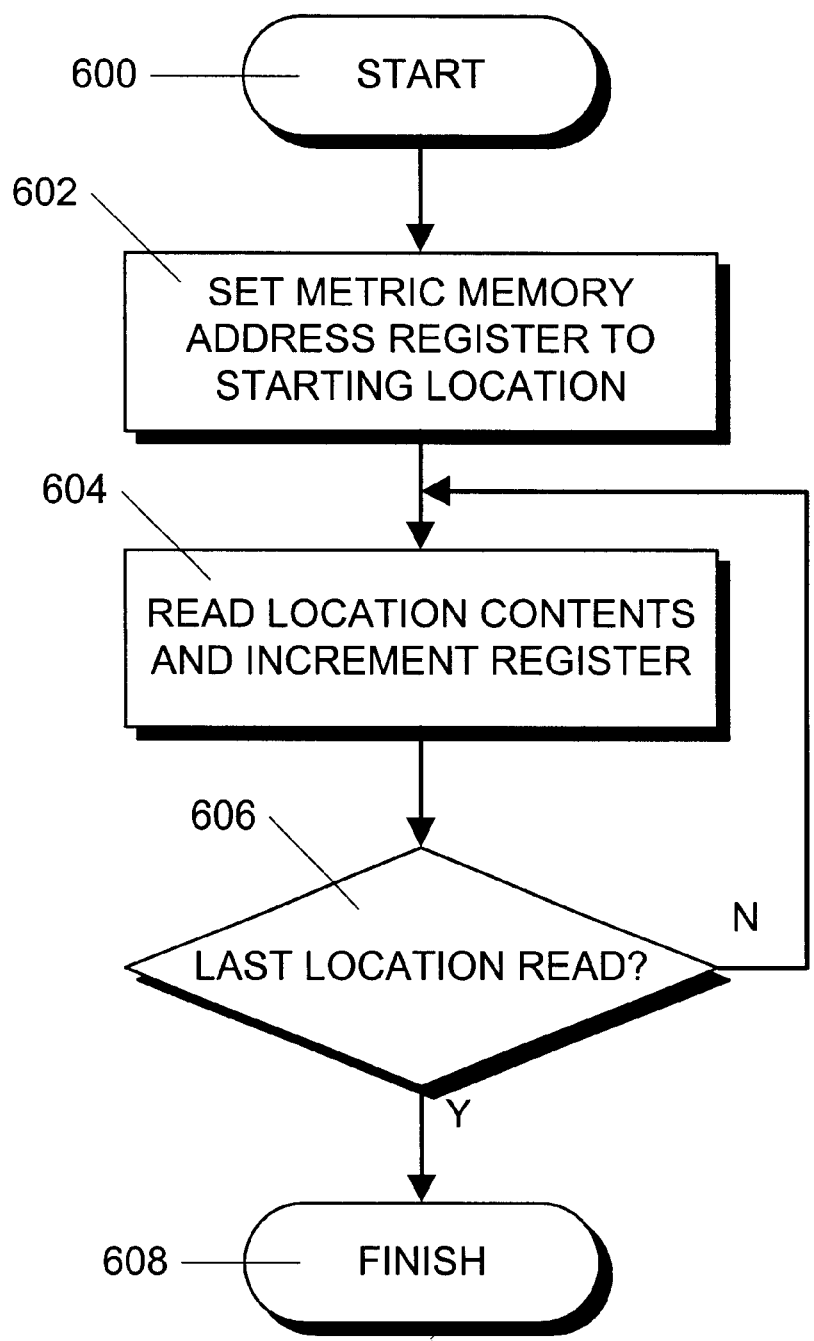
FIG. 6 is a flowchart illustrating a process for performing a metric sort.

A flowchart, illustrating the procedure for finding the metric memory addresses, and hence the cache addresses, corresponding to the cache lines having the smallest metrics is shown in FIG. 6. This process starts in step 600 and proceeds to step 602. In step 602, as previously mentioned, the memory controller, in response to a command to initiate a metric sort, sets its sort-address register to the initial memory address. Then, in step 604, the metric memory location corresponding to the address in the sort-address register is read and the contents and address provided to the metric sorter as described above. The sort-address register is then incremented.

The process then proceeds to step 606 in which a determination is made whether all metric memory locations have been read. If not, then the process returns to step 604 where the next metric memory location is read and processed. In this manner, the memory controller sequences through all memory locations until it reaches the last location as determined in step 606 at which time the memory controller halts and the process finishes in step 608. When this reading process has finished, the metric sorter contains the n smallest metrics along with their associated addresses.

Since the sorting process can take several microseconds, or even milliseconds, when the metric memory is large, it is typically implemented as a background task. The memory controller responds to other commands during this background task and interrupts the metric sort momentarily while it services those commands. Since it is possible for a new page to be brought into cache during this time, and hence, for the sequence number to be incremented, the metric generator 304 (FIG. 3) and the value registers (514–518, FIG. 5) are adjusted whenever this occurs. In particular, the metric generator is adjusted by incrementing the sequence number in the x-register, via increment line 414 (FIG. 4) by means of a signal generated by the operation decoder 400. This increment signal is passed to the metric sorter and the value registers are adjusted by incrementing their contents via an increment line 536.

When the metric sorter operates in background mode, it is also possible for one or more of the metrics captured by it to correspond to attributes that have been accessed since their capture. The result is that the associated lines may be paged out although they have again become active. While such events could be avoided by including additional logic to recognize an access to an already captured address, they should be highly unlikely and their consequence is not serious. (The paged out line may have to be immediately paged back in if it has, in fact, again become active.)

Figure 7A:
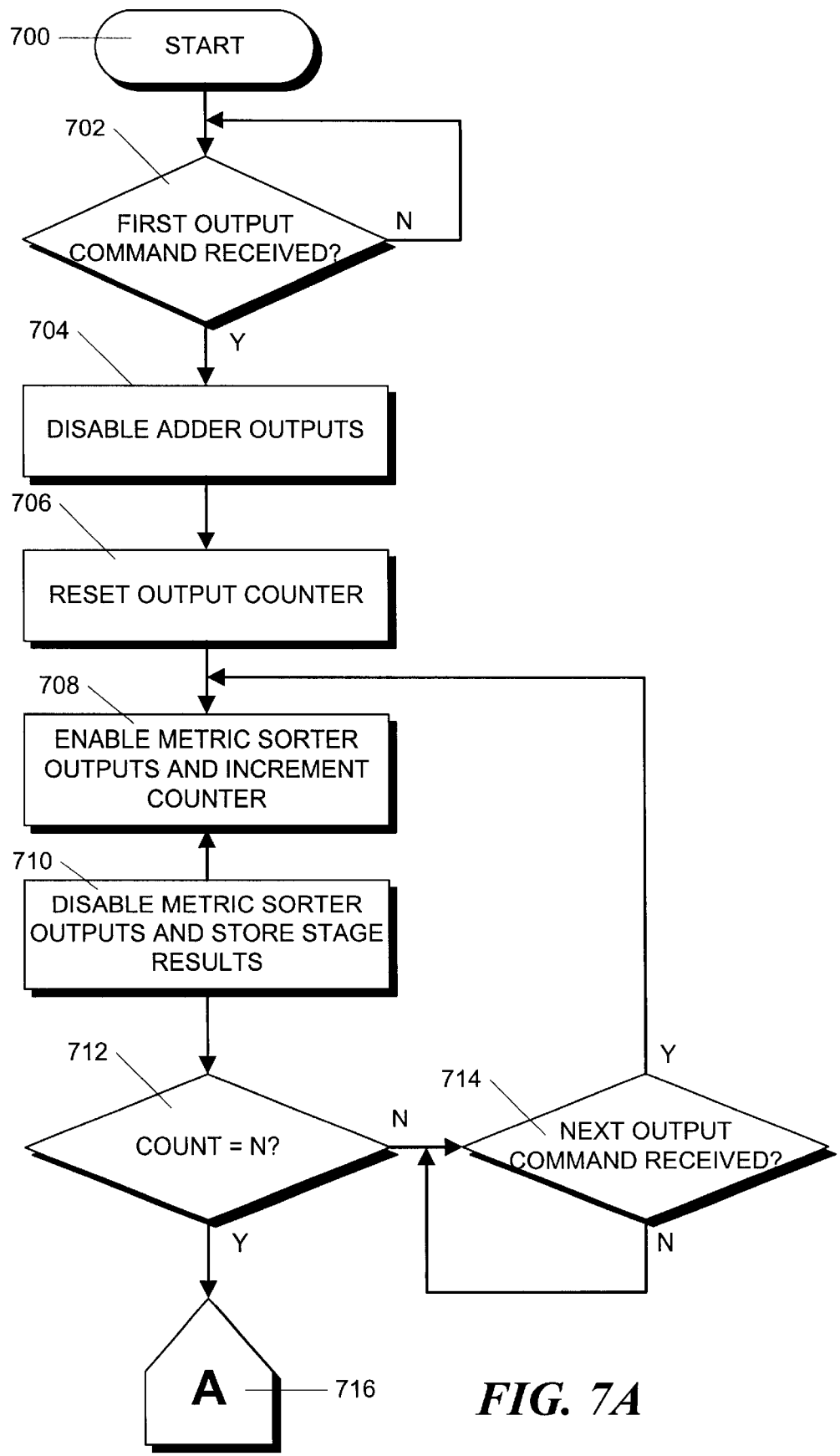
FIGS. 7A and 7B, when placed together, form a flowchart illustrating a process for reading values out of the metric sorter.
Figure 7B:
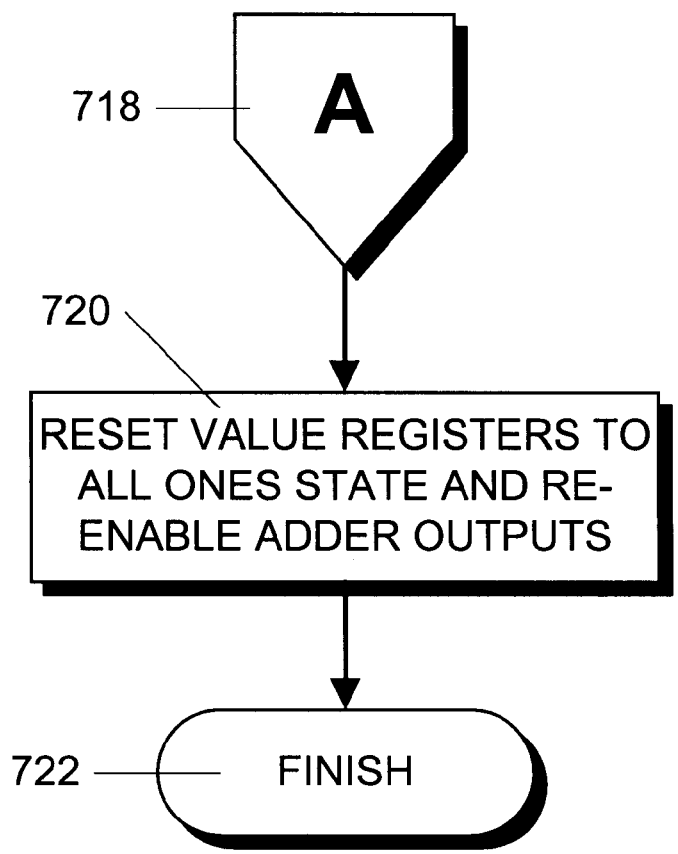

The flow chart in FIGS. 7A and 7B shows the steps taken in response to a command to enable the outputs of the metric sorter to be read, thereby allowing the system to determine which lines to collect onto the next page to be stored out to the underlying storage. Each command enables the sorter to produce the next sorted output and the system would normally receive n such commands, with n the number of lines stored on one page. The read out process begins in step 700 and proceeds to step 702 where a check is made to determine whether the first command has been received. If no command is received, the process proceeds back to step 702 and awaits the first command.

When the first command is received, the process proceeds to step 704 where the memory controller disables the adder outputs and forces them to the all-zeros state by means of the enable/disable line 522. Since the input to the sorter comparators 508–512 is the minimum possible metric, as described above, each sorter comparator will select the value and address stored in the previous stage. In step 706, the memory controller resets an output counter 560. The counter is used to determine when the n outputs have been read from the sorter.

In step 708, the controller enables the sorter outputs 554 and 558 and increments the counter 560. The sorter outputs 554 and 558 then reflect the values stored in address register 506 and value register 518. In step 710, the sorter outputs are then disabled and a store command is given to all value and address registers causing them to store the address and value of the previous stage.

In step 712, a determination is made whether all n outputs have been enabled. If not, the process proceeds to step 714 and waits for the next output command and, in response, enables the next output. When all n outputs have been read, the process proceeds, via off-page connectors 716 and 718, to step 720 where the controller resets all the value registers to the all-ones state by means of reset lead 538 and re-enables the adder outputs by means of lead 522, thereby enabling the sorter to function correctly on the next metric sort operation. The process then ends in step 722. Alternatively, depending on the interface to the rest of the system, the metric sorter read operation could equally well be implemented as a single burst read in which all sorter stages are read in sequence without waiting for individual output commands.

Once the addresses of the least-active attributes have been identified, the lines can be assembled onto one page, either through copying or through the use of a scatter/gather facility, if one is available, and then paged out to underlying storage.

In those situations in which the time needed to scan the entire metric memory exceeds the time between successive paging operations, the number of lines identified in each scan can be increased to some multiple of n by increasing the number of stages in the metric sorter 306 (FIG. 3) correspondingly, thereby enabling the cache lines for multiple pages to be identified in one scan. Alternatively, the metric memory 300 can be partitioned for sorting purposes, with each partition sorted in sequence and a page, identified by the sorter 306, selected for paging from each partition. This latter alternative results in sub-optimum performance since the smallest-metric lines in one partition are not necessarily the smallest-metric lines overall. Nevertheless, when the metric memory 300 is large and the number of partitions relatively small, the fact that lines are randomly distributed across the entire memory ensures that the performance impact of making these sub-optimum decisions is small. Obviously, these two techniques can also be used in combination if even more paging candidates need to be identified during each scan.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to particular embodiments of the metric generator and metric sorter, that other designs could be used in the same manner as that described. In addition the functions of the metric generator and sorter could be realized in software, or firmware, rather than hardware. Other aspects, such as the specific circuitry utilized to achieve a particular function, as well as other modifications to the inventive concept are intended to be covered by the appended claims

What is claimed is:

1. A method for improving the efficiency of a cache memory system in which cache lines in a cache memory are transferred in a multi-line page between the cache memory and an underlying storage, the method comprising:
   (a) when a page is brought into the cache memory from the underlying storage, assigning to each cache line in the page an activity measure that is indicative of the time at which the page was brought into the cache memory and the number of times the each cache line was accessed since it was brought into the cache memory; and
   (b) using activity measures assigned to the cache lines to determine which cache lines to retain in the cache memory and which cache lines to remove from the cache memory.

2. The method of claim 1 wherein step (b) comprises deriving from each activity measure a metric that orders all cache lines according to relative activity.

3. The method of claim 2 wherein step (b) comprises using a metric associated with each cache line to determine which cache lines to retain in the cache memory and which cache lines to remove from the cache memory.

4. The method of claim 2 wherein all metrics are stored in a memory different from the cache memory and the underlying storage.

5. The method of claim 1 wherein the activity measure comprises a sequence number that indicates when the assigned cache line was transferred from the underlying storage into the cache memory and a hit number that indicates a number of times the assigned cache line has been accessed after being transferred from the underlying storage into the cache memory.

6. The method of claim 5 wherein step (a) comprises maintaining a common sequence number that is incremented each time a cache miss occurs and assigning the common sequence number to each activity measure sequence number when the assigned cache line is transferred from the underlying storage to the cache memory.

7. The method of claim 5 wherein step (a) comprises incrementing the hit number in the activity measure assigned to a cache line in the cache memory each time the cache line is accessed.

8. The method of claim 7 wherein the hit number is incremented until a maximum hit number is reached.

9. The method of claim 8 wherein step (b) comprises deriving from each activity measure a metric that orders all cache lines according to relative activity.

10. The method of claim 9 wherein step of deriving a metric comprises adding the activity measure to the ones complement of the current sequence number and the maximum hit number.

11. The method of claim 10 wherein step (b) comprises sorting metrics associated with each cache line to determine which cache lines to include in the multi-line page that is transferred between the cache memory and the underlying storage.

12. A method for improving the efficiency of a cache memory system in which cache lines in a cache memory are transferred in a page between the cache memory and an underlying storage, the method comprising:
   (a) assigning to each cache line an activity measure that is indicative of the relative activity of the each cache line; and
   (b) using activity measures assigned to the cache lines to determine which cache lines to retain in the cache memory and which cache lines to remove from the cache memory including deriving a metric from each activity measure which metric orders all cache lines according to relative activity and using a metric associated with each cache line to determine which cache lines to include in a multi-line page that is transferred between the cache memory and the underlying storage.

13. The method of claim 12 wherein step (b) comprises sorting metrics associated with each cache line to determine which cache lines to include in the multi-line page that is transferred between the cache memory and the underlying storage.

14. Apparatus for improving the efficiency of a cache memory system in which cache lines in a cache memory are transferred in a multi-line page between the cache memory and an underlying storage, the apparatus comprising:
 a metric generator that, when a page is brought into the cache memory from the underlying storage, assigns to each cache line in the page an activity measure that is indicative of the time at which the page was brought into the cache memory and the number of times the each cache line was accessed since it was brought into the cache memory; and
 a memory control that uses activity measures assigned to the cache lines to determine which cache lines to retain in the cache memory and which cache lines to remove from the cache memory.

15. The apparatus of claim 14 wherein the memory control comprises a computation mechanism that derives from each activity measure a metric that orders all cache lines according to relative activity.

16. The apparatus of claim 15 wherein the memory control comprises a mechanism that uses a metric associated with each cache line to determine which cache lines to retain in the cache memory and which cache lines to remove from the cache memory.

17. The apparatus of claim 15 wherein all metrics are stored in a memory different from the cache memory and the underlying storage.

18. The apparatus of claim 14 wherein the activity measure comprises a sequence number that indicates when the assigned cache line was transferred from the underlying storage into the cache memory and a hit number that indicates a number of times the assigned cache line has been accessed after being transferred from the underlying storage into the cache memory.

19. The apparatus of claim 18 wherein the metric generator comprises a register that maintains a common sequence number that is incremented each time a cache miss occurs and a mechanism that assigns the common sequence number to each activity measure sequence number when the assigned cache line is transferred from the underlying storage to the cache memory.

20. The apparatus of claim 18 wherein the metric generator comprises a mechanism that increments the hit number in the activity measure assigned to a cache line in the cache memory each time the cache line is accessed.

21. The apparatus of claim 20 wherein the hit number is incremented until a maximum hit number is reached.

22. The apparatus of claim 21 wherein the memory control comprises a computation mechanism that derives from each activity measure a metric that orders all cache lines according to relative activity.

23. The apparatus of claim 22 wherein the computation mechanism comprises an adder that adds the activity measure to the ones complement of the current sequence number and the maximum hit number.

24. The apparatus of claim 23 wherein the memory control comprises a sorter that sorts metrics associated with each cache line to determine which cache lines to include in the multi-line page that is transferred between the cache memory and the underlying storage.

25. Apparatus for improving the efficiency of a cache memory system in which cache lines in a cache memory are transferred in a page between the cache memory and an underlying storage, the apparatus comprising:
 a metric generator that assigns to each cache line an activity measure that is indicative of the relative activity of the each cache line; and
 a memory control that uses activity measures assigned to the cache lines to determine which cache lines to retain in the cache memory and which cache lines to remove from the cache memory wherein the memory control comprises a computation mechanism that derives a metric from each activity measure which metric orders all cache lines according to relative activity and a metric handler that uses a metric associated with each cache line to determine which cache lines to include in a multi-line page that is transferred between the cache memory and the underlying storage.

26. The apparatus of claim 25 wherein the metric handler comprises a metric sorter that sorts metrics associated with each cache line to determine which cache lines to include in the multi-line page that is transferred between the cache memory and the underlying storage.

27. A computer program product for improving the efficiency of a cache memory system in which cache lines in a cache memory are transferred in a multi-line page between the cache memory and an underlying storage, the computer program product comprising a computer usable medium having computer readable program code thereon, including:
 program code, operable when a page is brought into the cache memory from the underlying storage, for assigning to each cache line in the page an activity measure that is indicative of the time at which the page was brought into the cache memory and the number of times the each cache line was accessed since it was brought into the cache memory; and
 program code for using activity measures assigned to the cache lines to determine which cache lines to retain in the cache memory and which cache lines to remove from the cache memory.

28. The computer program product of claim 27 wherein the program code for using activity measures comprises program code for deriving from each activity measure a metric that orders all cache lines according to relative activity.

29. The computer program product of claim 28 wherein the program code for using activity measures comprises program code for using a metric associated with each cache line to determine which cache lines to retain in the cache memory and which cache lines to remove from the cache memory.

30. The computer program product of claim 27 wherein the activity measure comprises a sequence number that indicates when the assigned cache line was transferred from the underlying storage into the cache memory and a hit number that indicates a number of times the assigned cache line has been accessed after being transferred from the underlying storage into the cache memory.

31. A computer program product for improving the efficiency of a cache memory system in which cache lines in a cache memory are transferred in a page between the cache memory and an underlying storage, the computer program product comprising a computer usable medium having computer readable program code thereon, including:

program code for assigning to each cache line an activity measure that is indicative of the relative activity of the each cache line; and program code for using activity measures assigned to the cache lines to determine which cache lines to retain in the cache memory and which cache lines to remove from the cache memory wherein program code for using activity measures comprises program code for deriving a metric from each activity measure which metric orders all cache lines according to relative activity and program code for using a metric associated with each cache line to determine which cache lines to include in a multi-line page that is transferred between the cache memory and the underlying storage.

* * * * *